United States Patent
Ito

(10) Patent No.: US 11,590,559 B2
(45) Date of Patent: Feb. 28, 2023

(54) METHOD OF MANUFACTURING CAST PRODUCT AND FORGED PRODUCT WITH INSERT JOINED THERETO

(71) Applicant: TOYOTA JIDOSHA KABUSHIKI KAISHA, Toyota (JP)

(72) Inventor: Takehiro Ito, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/531,597

(22) Filed: Nov. 19, 2021

(65) Prior Publication Data

US 2022/0241845 A1 Aug. 4, 2022

(30) Foreign Application Priority Data

Feb. 1, 2021 (JP) .............................. JP2021-014124

(51) Int. Cl.
| | |
|---|---|
| *B21K 25/00* | (2006.01) |
| *B21K 29/00* | (2006.01) |
| *B22D 27/11* | (2006.01) |
| *B21J 5/00* | (2006.01) |
| *B22D 30/00* | (2006.01) |

(52) U.S. Cl.
CPC ............ *B21K 25/00* (2013.01); *B21J 5/002* (2013.01); *B21K 29/00* (2013.01); *B22D 27/11* (2013.01); *B22D 30/00* (2013.01)

(58) Field of Classification Search
CPC .......... B21K 25/00; B21K 29/00; B21J 5/002; B22D 27/11; B22D 30/00; B22D 18/02; B22D 19/04; B22D 19/00; B23P 11/00; B23P 15/00; B23P 17/00; B23P 19/02; B21D 39/00
See application file for complete search history.

(56) References Cited

FOREIGN PATENT DOCUMENTS

| JP | 2006-312192 A | 11/2006 |
|---|---|---|
| JP | 2006312192 A * | 11/2006 |
| JP | 2007-253172 A | 10/2007 |
| JP | 2018-089657 A | 6/2018 |
| JP | 2020-078826 A | 5/2020 |

OTHER PUBLICATIONS

Aoyama S; JP-2006312192-A; Nov. 2006 Machine translation (Year: 2006).*

* cited by examiner

*Primary Examiner* — Lee A Holly
(74) *Attorney, Agent, or Firm* — Oliff PLC

(57) ABSTRACT

An insert including a taper is covered with a molten metal. A metal molded product with the insert joined thereto is generated by semi-cooling the molten metal to a press-fitting temperature which is higher than a recrystallization temperature of the molten metal and lower than a melting point of the molten metal. A fitting hole which is filled with the insert is formed in the metal molded product. The taper is fitted into the fitting hole. An undercut is not formed in front of a tip of the taper. The insert is press-fitted into the fitting hole while pressing and extending the fitting hole with the taper in a thinning direction of the taper at a press-fitting temperature. The metal molded product is further cooled with the press-fitting maintained.

10 Claims, 8 Drawing Sheets

METHOD OF MANUFACTURING CAST PRODUCT AND FORGED PRODUCT WITH INSERT JOINED THERETO

CROSS-REFERENCE TO RELATED APPLICATION

This application claims priority to Japanese Patent Application No. 2021-014124 filed on Feb. 1, 2021, incorporated herein by reference in its entirety.

BACKGROUND

1. Technical Field

The disclosure relates to a method of manufacturing a cast product and a forged product with an insert joined thereto.

2. Description of Related Art

In Japanese Unexamined Patent Application Publication No. 2018-089657 (JP 2018-089657 A), a rivet of an iron-based metal is joined to a member of, for example, a carbon fiber reinforced plastic (CFRP), an aluminum alloy, or a magnesium alloy other than the iron-based metal by press-fitting the rivet into a hole which is provided in the member.

SUMMARY

In order to strongly join a metallic member and an insert by press-fitting the insert into a hole of the metallic member according to the method described in JP 2018-089657 A, the hole and the insert both need to be accurately shaped separately. A position of the insert relative to the hole has to be accurately determined at the time of press-fitting. An aspect of the disclosure provides a method of strongly joining a hole of a metallic member and an insert regardless of accuracy of shaping and positioning of the hole and the insert.

In Japanese Unexamined Patent Application Publication No. 2006-312192 (JP 2006-312192 A), an insert formed of a steel material is joined to aluminum by cast-coating the insert with aluminum. In enhancement of joining strength in the cast-coating, dependency on enhancement of shaping or positioning accuracy is not as high as in press-fitting. Since there is no clearance between the insert and a cast product, the joining strength is also high. However, blow holes and other internal defects are generated in the metallic member around the cast-coated insert. The internal defects weaken joining between the insert and the metallic member. An aspect of the disclosure provides a method of removing internal defects around an insert which are caused by cast-coating.

(1) According to an aspect of the disclosure, there is provided a method of manufacturing a cast product with an insert joined thereto, the method including: covering an insert, which is formed of a first material which is a metal or nonmetal and which includes a taper, with a molten metal which is formed of a second material which is a metal; generating a cast product which is formed of the second material by semi-cooling the molten metal to a temperature (hereinafter referred to as a press-fitting temperature) which is higher than a recrystallization temperature of the second material and lower than a melting point of the second material, a hole which is filled with the insert (hereinafter referred to as a fitting hole) being formed in the cast product, the taper being fitted into the fitting hole, and an undercut not being formed in front of a tip of the taper; press-fitting the insert into the fitting hole of the cast product while pressing and extending the fitting hole with the taper in a thinning direction of the taper (hereinafter referred to as a press-fitting direction) at the press-fitting temperature; and further cooling the cast product while maintaining the press-fitting.

(2) In the method according to (1), the fitting hole may penetrate the cast product at least after the insert has been press-fitted.

(3) The method according to (1) or (2) may be performed using a mold which includes a first surface and a second surface facing each other with a cavity in the mold interposed therebetween, the first surface including a first opening and the second surface including a second opening. The method may further include: disposing the insert in the cavity; interposing the insert between an advance pin disposed on the first surface side and a retreat pin disposed on the second surface side; blocking the first opening with the insert or the advance pin and blocking the second opening with the insert or the retreat pin; covering the insert with the molten metal by injecting the molten metal into the cavity; and performing the press-fitting by causing the advance pin, the insert, and the retreat pin to move in the press-fitting direction in a line.

(4) The method according to (3) may further include: blocking the second opening with the retreat pin; extruding the molten metal, which has permeated a space between a head of the insert and a top of the retreat pin and has solidified, to the periphery thereof by pressing the insert with the advance pin; and further cooling the cast product while maintaining the extruded state.

(5) The method according to (3), may further include: blocking the second opening with the retreat pin, a top of the retreat pin being larger than the tip of the taper; forming a space in the second opening by press-fitting the retreat pin with the head of the insert and pressing a surplus volume of the cast product out of the space over the second surface by press-fitting the insert; and further cooling the cast product while maintaining the pressed-out state.

(6) In the method according to (5), the top of the retreat pin may additionally include a protrusion at the center thereof. The method may further include: blocking the second opening with an outer circumference of the retreat pin; additionally covering the protrusion with the molten metal by injecting the molten metal into the cavity; and replacing at least a part of a space occupied by the protrusion with the head of the insert by press-fitting the insert.

(7) In the method according to (6), the insert may additionally include a cylindroid surface which extends to the head and which is parallel to the press-fitting direction in front of the tip and the cylindroid surface may be fitted into the fitting hole.

(8) In the method, a melting point of the first material may be higher than the melting point of the second material, and a Young's modulus of the first material at the press-fitting temperature may be higher than a Young's modulus of the second material.

(9) In the method, the first material may be a simple substance or an alloy of iron, the second material may be a simple substance or an alloy of aluminum, and the press-fitting temperature may be higher than 150° C.

(10) According to another aspect of the disclosure, there is provided a method of manufacturing a forged product with an insert joined thereto, the method including: shaping a matte by pressing the matte with a mold at a temperature (hereinafter referred to as a forging temperature) which is higher than a recrystallization temperature of the matte and lower than a melting point of the matte; forming a hole which is filled with an insert with a taper (hereinafter referred to as a fitting hole) by press-fitting the insert into the matte at the forging temperature, the taper being fitted into the fitting hole; generating a forged product formed of the matte by semi-cooling the matte to a temperature (hereinafter referred to as a re-press-fitting temperature) which is higher than the recrystallization temperature of the matte and lower than the forging temperature; re-press-fitting the insert into the fitting hole of the forged product in a thinning direction of the taper while clamping the periphery of the fitting hole of the forged product with the mold and pressing and extending the fitting hole with the taper at the re-press-fitting temperature; and further cooling the forged product while maintaining the re-press-fitting.

According to an aspect of the disclosure, it is possible to provide a method of strongly joining a hole of a metallic member and an insert regardless of accuracy of shaping and positioning of the hole and the insert. According to another aspect of the disclosure, it is possible to provide a method of removing internal defects around an insert which are caused by cast-coating.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
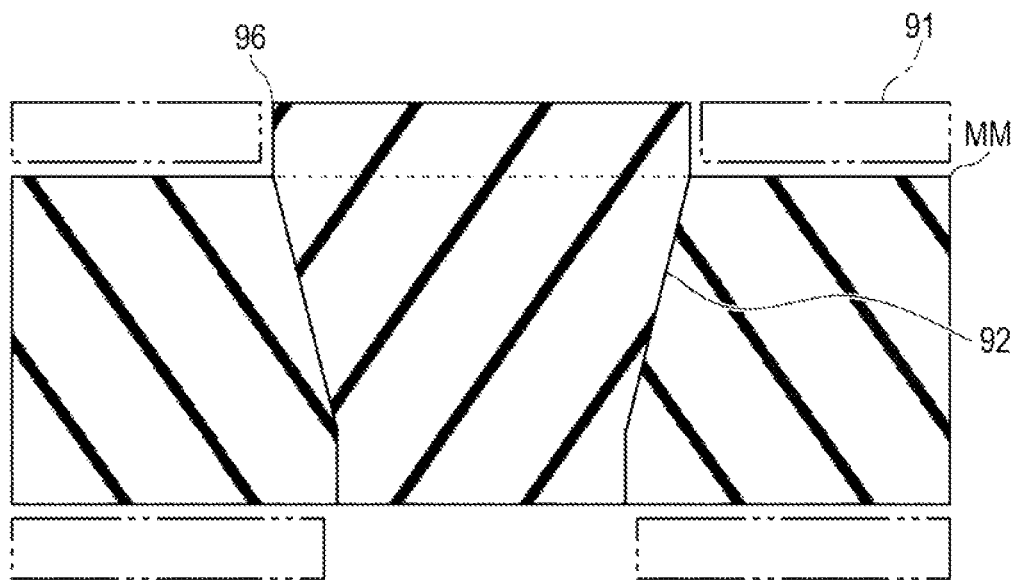
FIG. 1 is a diagram schematically illustrating joining between an insert and a metal molded product.
Figure 1:
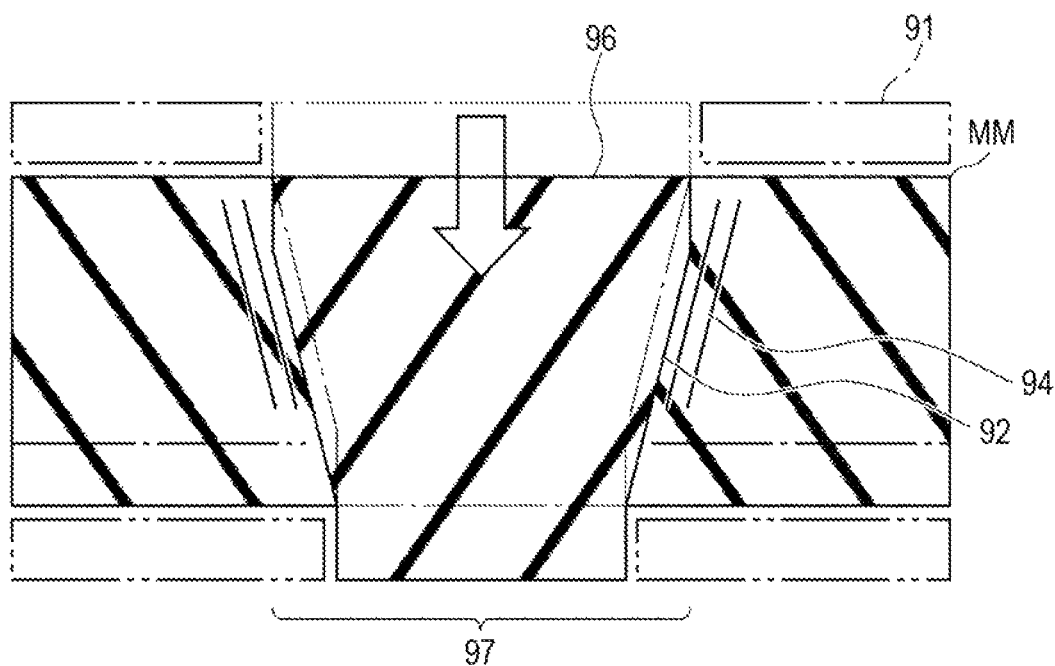

FIG. 1 is a sectional view illustrating an example of joining between an insert 96 and a metal molded product MM. In the following embodiments, a section is a longitudinal section unless otherwise mentioned. The metal molded product MM is a cast product or a forged product. The insert 96 and the metal molded product MM are formed of different materials. The upper part of the drawing illustrates a state in which the insert 96 is inserted into the metal molded product MM. The lower part of the drawing illustrates a state in which the insert 96 is further inserted into the metal molded product MM.

Cast Product

When the metal molded product MM illustrated in the upper part of FIG. 1 is a cast product, the insert 96 is cast-coated with a molten metal in advance. The insert 96 includes a taper 97. In the upper part of the drawing, a fitting hole 92 is formed in the metal molded product MM by the cast-coating. The taper 97 is fitted into the fitting hole 92.

It is preferable that an undercut not be formed in front of a tip of the taper 97 in the upper part of FIG. 1, that is, the lower end in the drawing. In this embodiment, the tip of the taper is the thin side. It is preferable that the fitting hole 92 penetrate the metal molded product MM. In another aspect, the fitting hole 92 does not penetrate the metal molded product MM.

In the upper part of FIG. 1, the metal molded product MM is generated by semi-cooling the resultant to a press-fitting temperature. The press-fitting temperature is higher than a recrystallization temperature of the metal molded product MM. The insert 96 is press-fitted into the fitting hole 92 of the metal molded product MM while pressing and extending the fitting hole 92 in a thinning direction of the taper 97 using the taper 97. The press-fitting is performed by further inserting the insert 96 which has been first inserted into the fitting hole 92 into the fitting hole 92. The press-fitting generates a strong spreading pressure on the surface of the fitting hole 92. The press-fitting also causes a strong clamping pressure on the surface of the taper 97.

In the lower part of FIG. 1, grain flow lines 94 are newly formed around the fitting hole 92 by the press-fitting. Even when internal defects are generated around the fitting hole 92, the internal defects are crushed by a plastic flow of a molten metal in a semi-cooled state and the pressure of the press-fitting. Since the molten metal in the semi-cooled state has insufficient fluidity, the pressure of the press-fitting is concentrated around the fitting hole 92. The metal molded product MM is further cooled with the press-fitting of the insert 96 maintained. In this way, junction is formed between the insert 96 and the metal molded product MM. The junction based on the press-fitting is stronger than junction obtained by cast coating alone.

In the lower part of FIG. 1, it is preferable that the fitting hole 92 penetrate the metal molded product MM. In another aspect, the fitting hole 92 does not penetrate the metal molded product MM.

Forged Product

When the metal molded product MM illustrated in the upper part of FIG. 1 is a forged product, forging is performed in advance by pressing a matte with a mold 91 and press-fitting the insert 96 into the matte. The forging is performed at a temperature (hereinafter referred to as a forging temperature) which is higher than a recrystallization temperature of the matte and lower than a melting point thereof. In the upper part of the drawing, a fitting hole 92 is formed in the metal molded product MM due to the press-fitting of the insert 96. The taper 97 is fitted into the fitting hole 92.

In the upper part of FIG. 1, it is preferable that the fitting hole 92 penetrate the metal molded product MM. In another aspect, the fitting hole 92 does not penetrate the metal molded product MM. The metal molded product MM is generated by semi-cooling the metal molded product MM to a re-press-fitting temperature which is lower than the forging temperature. The re-press-fitting temperature is higher than the recrystallization temperature of the metal molded product MM.

As illustrated in the lower part of FIG. 1, the insert 96 is re-press-fitted into the fitting hole 92 of the metal molded product MM while pressing and extending the fitting hole 92 using the taper 97 in a thinning direction of the taper 97. The press-fitting is performed again by further inserting the insert 96 which has been first inserted into the fitting hole 92 into the fitting hole 92.

In the lower part of FIG. 1, since a metal at the re-press-fitting temperature has insufficient fluidity in comparison with a metal at the forging temperature, the pressure of the re-press-fitting is concentrated particularly around the fitting hole 92. The re-press-fitting generates a strong spreading pressure on the surface of the fitting hole 92. The re-press-fitting also generates a strong clamping pressure on the surface of the taper 97. The re-press-fitting of the insert 96 is performed while the periphery of the fitting hole 92 is clamped by the mold 91.

In the lower part of FIG. 1, the metal molded product MM is further cooled with the re-press-fitting of the insert 96 maintained. In this way, a junction is formed between the insert 96 and the metal molded product MM. The junction based on the re-press-fitting is stronger than junction obtained by performing only press-fitting at the forging temperature.

In the lower part of FIG. 1, it is preferable that the fitting hole 92 penetrate the metal molded product MM. In another aspect, the fitting hole 92 does not penetrate the metal molded product MM.

The disclosure will be described below in more detail, for example, based on the assumption that the metal molded product MM is a cast product. The following example can also be applied to the case in which the metal molded product MM is a forged product.

Outline

Figure 2:
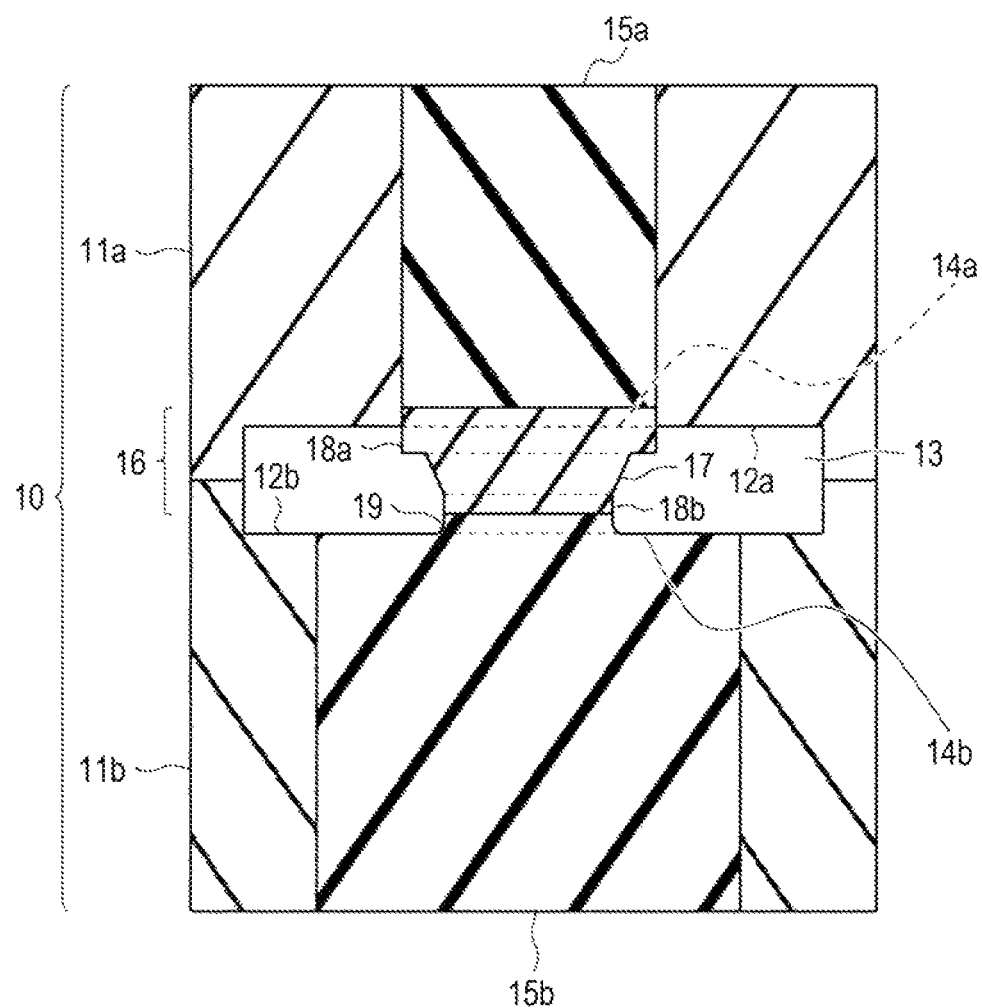
FIG. 2 is a sectional view of an insert and a mold.

FIG. 2 is a sectional view of an insert 16 and other tools. The other tools include a mold 10, an advance pin 15a, and a retreat pin 15b. The mold 10 includes an upper mold 11a and a lower mold 11b. The mold 10 has a cavity 13 in an internal space interposed between the upper mold 11a and the lower mold 11b. A cast product with an insert 16 joined thereto is manufactured by cast coating and press-fitting using the tools.

Figure 3:
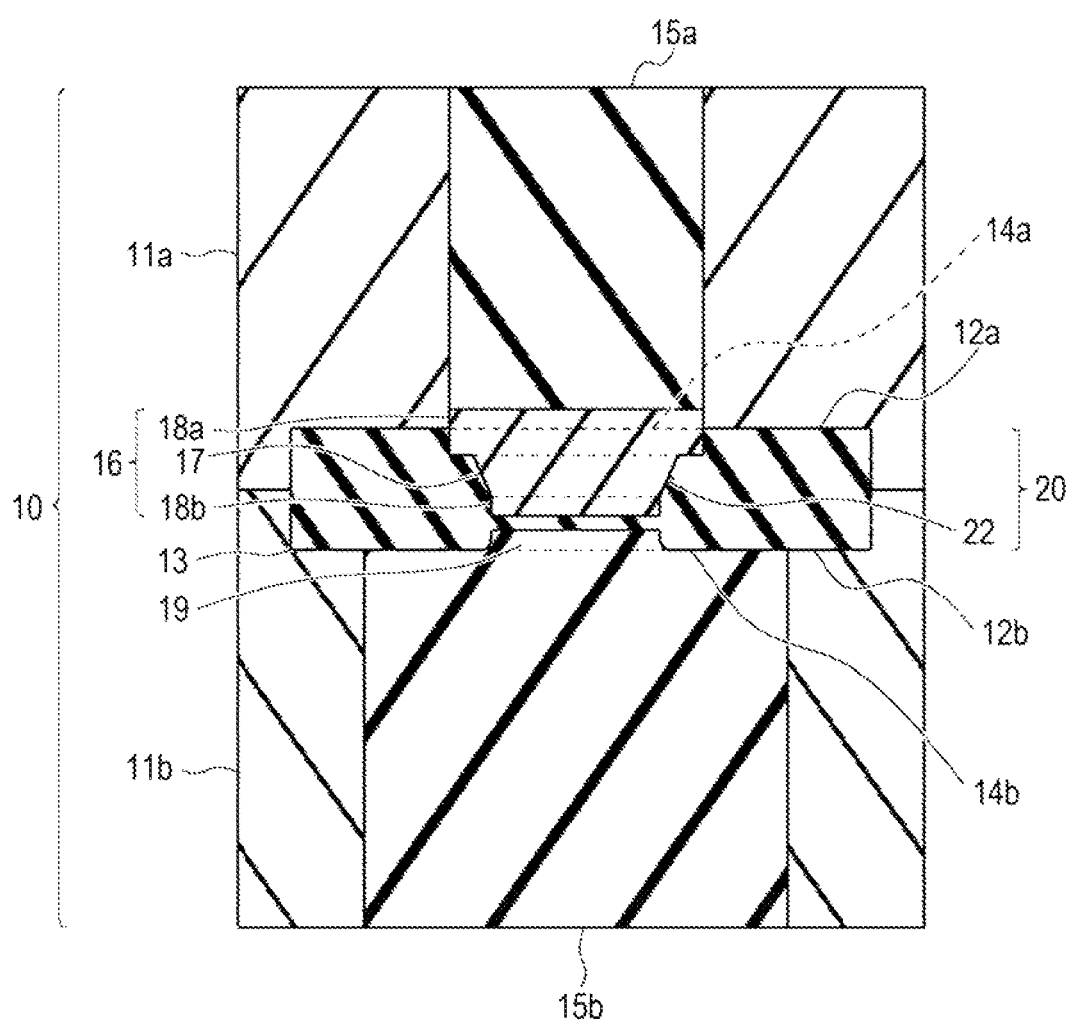
FIG. 3 is a sectional view of an insert and a molten metal.
Figure 4:
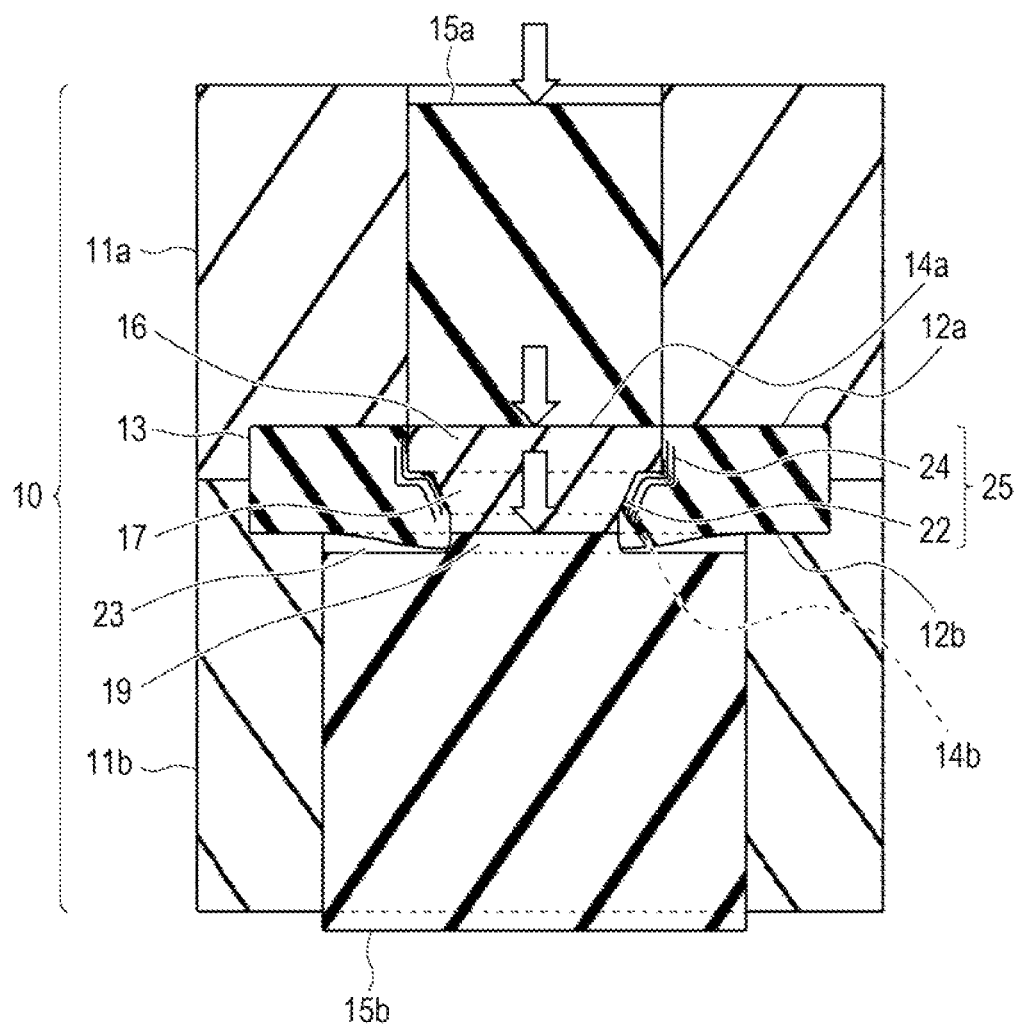
FIG. 4 is a sectional view of an insert and a cast product.

FIG. 3 illustrates a section of a molten metal 20 which is injected into the mold 10. Die-casting is performed as casting. FIG. 4 illustrates a section of a cast product 25 which is formed in the cavity 13. The insert 16 is press-fitted into the cast product 25 which is located in the cavity 13.

Insert

The description will now return to FIG. 2. The insert 16 illustrated in FIG. 2 is formed of a material different from a casting metal. In this embodiment, a material of the insert 16 is referred to as a first material. The first material is a metal or nonmetal. In an aspect, the metal is one of simple substances of iron, copper, titanium, and nickel and alloys thereof. In an aspect, an alloy of iron is steel. In an aspect, the nonmetal is a ceramic. In this embodiment, the casting metal is referred to as a second material. The insert 16 is cast-coated with the second material.

As illustrated in FIG. 2, the insert 16 is disposed in the cavity 13. The insert 16 includes a taper 17 at the center thereof. As described above, press-fitting is performed in the thinning direction of the taper 17. This direction is referred to as a press-fitting direction. The press-fitting direction in the drawing is downward. The tip of the taper 17 is located on a head side in the press-fitting direction.

As illustrated in FIG. 2, the insert 16 further includes a cylindroid surface 18a parallel to the press-fitting direction on a thick side of the taper 17. The cylindroid surface 18a extends to the tail of the insert 16. In this embodiment, the "tail" of the insert 16 is a rear end in the press-fitting direction. In another aspect, the insert 16 does not include a cylindroid surface 18a. An end face of the insert 16 on a side on which it comes into contact with the advance pin 15a is flat.

As illustrated in FIG. 2, the insert 16 further includes a cylindroid surface 18b parallel to the press-fitting direction on a thin side of the taper 17. The cylindroid surface 18b extends to the head of the insert 16. In this embodiment, the head of the insert 16 is a front end in the press-fitting direction. In another aspect, the insert 16 does not include a cylindroid surface 18b. An end face of the insert 16 on a side on which it comes into contact with the retreat pin 15b is flat.

The shape of the insert 16 illustrated in FIG. 2 is an example. The tail of the insert 16 may extend to the inside of the upper mold 11a. The head of the insert 16 may extend to the inside of the lower mold 11b. The insert 16 may have a cavity therein.

Mold

As illustrated in FIG. 2, the mold 10 includes a first surface 12a and a second surface 12b. The first surface 12a is located on the upper mold 11a. The second surface 12b is located on the lower mold 11b. The first surface 12a and the second surface 12b face each other with the cavity 13 interposed therebetween. The first surface 12a includes a first opening 14a. The second surface 12b includes a second opening 14b.

Pins

As illustrated in FIG. 2, the advance pin 15a is disposed on the first surface 12a side. The retreat pin 15b is disposed on the second surface 12b side. The advance pin 15a and the retreat pin 15b are disposed with the insert 16 interposed therebetween. In an aspect, the tail of the insert 16 is in contact with the top of the advance pin 15a, and the head of the insert 16 is in contact with the top of the retreat pin 15b. In this embodiment, the "top" of each pin is an end close to the insert.

It is preferable that the top of the retreat pin 15b illustrated in FIG. 2 be larger than the head of the insert 16 in a plan view. It is preferable that the top of the retreat pin 15b be larger than the tip of the taper 17 in a plan view. It is preferable that the top of the retreat pin 15b further include a protrusion 19 at the center thereof. In an aspect, the protrusion 19 has the same size as the head of the insert 16 in a plan view. In an aspect, the protrusion 19 has the same size as the cylindroid surface 18b of the insert 16 in a plan view. In an aspect, the protrusion 19 has the same size as the tip of the taper 17 in a plan view.

As illustrated in FIG. 2, the first opening 14a is blocked by the insert 16. In another aspect, the first opening 14a is blocked by the advance pin 15a. The second opening 14b is blocked by the retreat pin 15b. In another aspect, the second opening 14b is blocked by the insert 16. Preferably, the second opening 14b is blocked by an outer circumference of the top of the retreat pin 15b. In an aspect, the outer circumference of the retreat pin 15b becomes flush with the second surface 12b of the lower mold 11b such that there is no step difference therebetween. In another aspect, the second opening 14b is blocked by the protrusion 19.

Cast Coating

As illustrated in FIG. 3, a molten metal 20 formed of a second material is injected into the cavity of the mold 10. The insert 16 is covered with the molten metal 20. It is preferable that the protrusion 19 be additionally covered with the molten metal 20. A molded product formed of the second material is generated by semi-cooling the molten metal 20 to a predetermined press-fitting temperature.

The press-fitting temperature of the molten metal 20 illustrated in FIG. 3 is higher than a recrystallization temperature of the second material of the molten metal 20 and lower than a melting point of the second material. In an aspect, the melting point of the first material of the insert 16 is higher than the melting point of the second material of the molten metal 20.

As illustrated in FIG. 3, a hole which is filled with the insert 16, that is, a fitting hole 22, is formed in the molded product which is formed of the molten metal 20. The taper 17 is fitted into the fitting hole 22. The cylindroid surfaces 18a and 18b are fitted into the fitting hole 22. It is preferable that no undercut be formed in the molded product in front of the tip of the taper 17.

In an aspect, the second material of the molten metal 20 illustrated in FIG. 3 is one of simple substances of aluminum, magnesium, and zinc and alloys thereof.

For example, the second material of the molten metal 20 illustrated in FIG. 3 is pure aluminum or an aluminum alloy. In an aspect, the press-fitting temperature is higher than 150° C. The second material exhibits high ductility at 150° C. or higher. Accordingly, the fitting hole 22 is not likely to crack when the insert 16 is fitted into the molded product in the following strokes.

Press-Fitting

As illustrated in FIG. 4, the insert 16 is fitted into the fitting hole 22 at the press-fitting temperature. The press-fitting is performed in the thinning direction of the taper 17, that is, a press-fitting direction. The press-fitting is performed by inserting the insert 16 into the fitting hole 22 while pressing and extending the fitting hole 22 with the taper 17. The press-fitting generates a pressure for spreading the surface of the fitting hole 22 and a pressure for clamping the surface of the taper 17.

As illustrated in FIG. 4, the press-fitting is performed by pressing the insert 16 and the retreat pin 15b with the advance pin 15a. The advance pin 15a and the insert 16 slide on the first opening 14a in the press-fitting direction. The retreat pin 15b slides on the second opening 14b in the press-fitting direction.

In FIG. 4, the advance pin 15a, the insert 16, and the retreat pin 15b move in the press-fitting direction in a line. When the retreat pin 15b leaves the cavity 13, the insert 16 enters a space which has been left by the retreat pin 15b. The retreat pin 15b decreases a pressure for pushing back the insert 16 which is applied to the head of the insert 16.

In an aspect, both the advance pin 15a and the insert 16 illustrated in FIG. 4 are rotationally symmetric, and the rotation centers thereof match each other. In another aspect, the advance pin 15a pushes the insert 16 inward while rotating around the rotation center. Since a strong shearing force acts on the surface of the fitting hole 22, the surface of the fitting hole 22 is further hardened and a strong junction is obtained.

In an aspect, the recrystallization temperature of the second material of the cast product 25 illustrated in FIG. 4 is higher than room temperature. For example, room temperature ranges from 5° C. to 35° C. (JIS Standard). The Young's modulus of the first material of the insert 16 is higher than the Young's modulus of the second material of the cast product 25 at the press-fitting temperature. Accordingly, metal tissue near the fitting hole 22 falls into a state in which it is forged by the insert 16. Grain flow lines 24 are formed in the metal tissue near the fitting hole 22 of the cast product 25 due to the press-fitting.

In the aspect illustrated in FIG. 4, it is preferable that the fitting hole 22 penetrate the cast product 25 after the press-fitting. Since stress is easily concentrated on a bottom of a bottomed hole and the bottom is likely to crack, it is advantageous that the fitting hole 22 not include such a bottom. In another aspect, the fitting hole 22 does not penetrate the cast product 25.

Extraction of Cast Product

In FIG. 4, the cast product 25 is further cooled with the press-fitting of the insert 16 maintained as described above. Preferably, the cast product 25 is cooled to a temperature lower than the recrystallization temperature of the second material. By detaching the upper mold 11a, the lower mold 11b, the advance pin 15a, and the retreat pin 15b from the cast product 25, the cast product 25 with the insert 16 joined thereto is extracted.

Application Example: Removal of Burrs

The description will now return to FIG. 3. As illustrated in the drawing, the molten metal 20 may permeate a space between the head of the insert 16 and the top of the retreat pin 15b. Specifically, the molten metal permeates a space between the head of the insert 16 and the protrusion 19. The permeated molten metal 20 is solidified to serve as burrs. In an aspect, the burrs are removed at the time of press-fitting.

As illustrated in FIG. 4, the insert 16 is press-fitted by the advance pin 15a. The retreat pin 15b is supported by the second opening 14b. The head of the insert 16 reaches the top of the retreat pin 15b. The insert 16 and the retreat pin 15b presses the burrs formed therebetween aside. This removal of burrs is performed at the same time as joining the insert 16 to the cast product 25 by press-fitting.

In FIG. 4, the cast product 25 is further cooled while a state in which the burrs are pressed and removed from between the insert 16 and the retreat pin 15b is maintained. Preferably, the cast product 25 is cooled to a temperature lower than the recrystallization temperature of the second material.

In another aspect illustrated in FIG. 4, the burrs between the insert 16 and the retreat pin 15b may remain in the cast product 25. The burrs may be removed after the cast product 25 has been extracted from the mold 10 and the retreat pin 15b has been detached from the cast product 25.

Application Example: Pressing-Out of Surplus Volume

As illustrated in FIGS. 3 and 4, metal near the fitting hole 22 is pressed and removed by press-fitting the insert 16 into the cast product 25. Metal between the insert 16 and the retreat pin 15b is also pressed and removed. Since the cast product 25 is semi-cooled, a pressure generated therefrom stays near the fitting hole 22. When the pressure is excessively high, the insert 16 is not easily press-fitted. Accordingly, the retreat pin 15b is designed as follows to weaken the press-fitting by pressing out such a surplus volume of the cast product 25.

As illustrated in FIG. 4, the top of the retreat pin 15b is larger than the tip of the taper 17. Accordingly, a space 23 is formed in the second opening 14b by press-fitting the retreat pin 15b with the tip of the taper 17. As a result, the surplus volume of the cast product 25 in the space 23 over the second surface 12b is pressed and removed.

As illustrated in FIG. 4, the cast product 25 is further cooled while a state in which the surplus volume of the cast product 25 is pressed out is maintained.

Application Example: Adjustment of Protrusion Height of Insert

The description will now return to FIG. 2. The top of the retreat pin 15b includes the protrusion 19 at the center thereof. The second opening 14b is blocked by the outer circumference of the retreat pin 15b. By injecting a molten metal into the cavity 13, the protrusion 19 is covered with the molten metal 20 as illustrated in FIG. 3. The molten metal 20 is cooled to the press-fitting temperature, and then the insert 16 is press-fitted in a range in which a press-fitting depth is not greater than the height of the protrusion 19 as illustrated in FIG. 4.

By press-fitting the insert 16 as illustrated in FIG. 4, at least a part of the space occupied by the protrusion 19, preferably the whole part, is replaced with the head of the insert 16.

In an aspect illustrated in FIGS. 2 to 4, the protrusion 19 has the same size as the head of the insert 16 in a plan view. In an aspect, the protrusion 19 has the same size as the cylindroid surface 18b of the insert 16 in a plan view. In an aspect, the protrusion 19 has the same size as the tip of the taper 17 in a plan view. Accordingly, the head of the insert 16 smoothly enters the space occupied by the protrusion 19.

It is preferable that the head of the insert 16 do not protrude from the surface of the cast product 25 as illustrated in FIG. 4. While the press-fitted state is maintained, the cast product 25 is further cooled. By adjusting the height of the protrusion 19, a protrusion height or a recessed depth of the head of the insert 16 with respect to the second surface 12b of the mold 10 can be set to an arbitrary value. In a preferable aspect, the second surface 12b of the mold 10 and the end face of the head of the insert 16 are made to be flush with each other at the time of completion of press-fitting.

Modified Example: Variations in Shape of Insert

Figure 5:
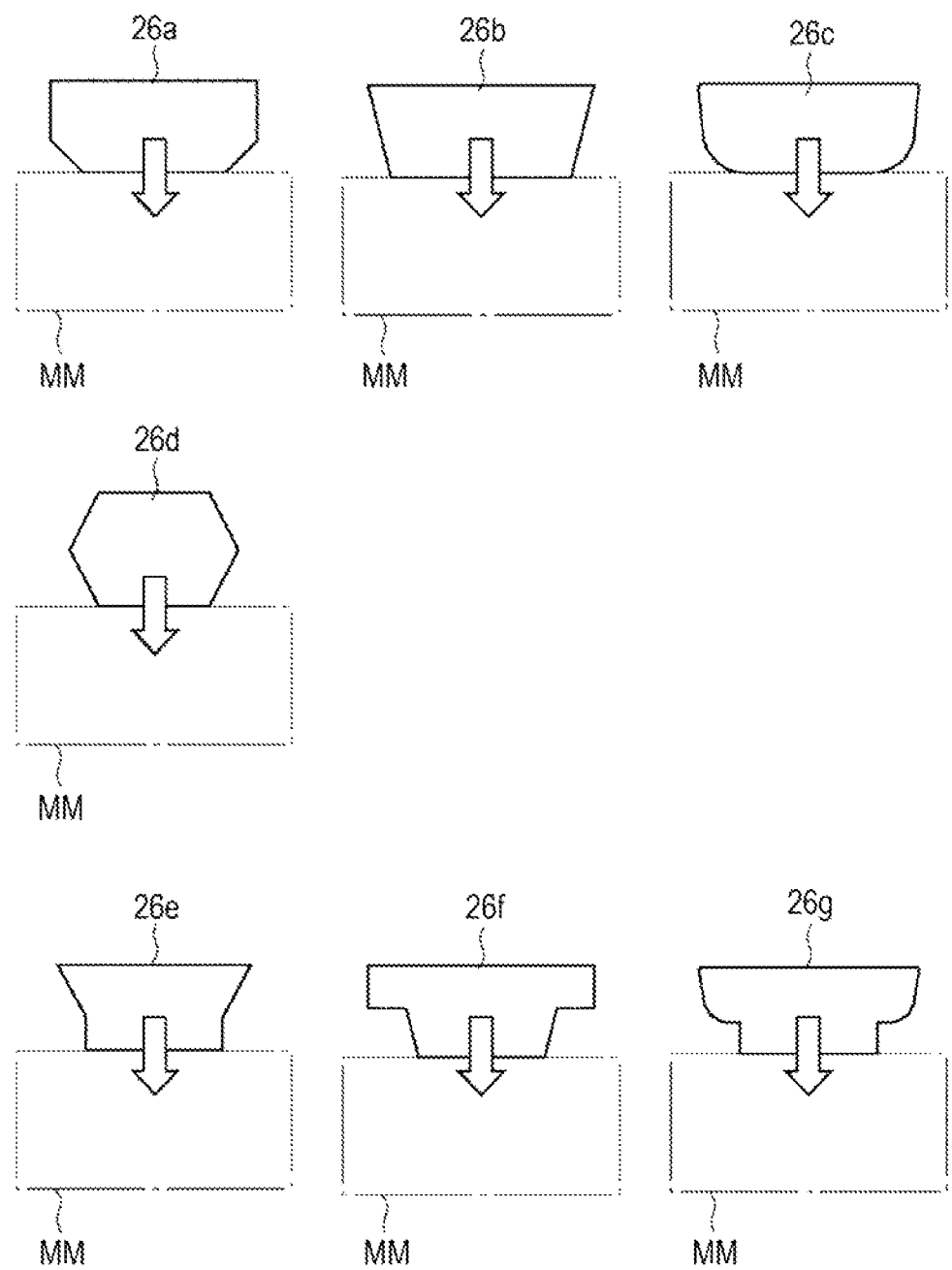
FIG. 5 is a sectional view of various inserts.

FIG. 5 illustrates sectional shapes of variations of the insert 96 (FIG. 1) or the insert 16 (FIGS. 2 to 4). Inserts 26a to 26g are press-fitted into the metal molded product MM by moving downward in the drawing. For the purpose of convenience, it is assumed that the head of each insert is located on the lower side in the drawing and the tail of each insert is located on the upper side in the drawing. Unless otherwise mentioned, the taper of each insert becomes thinner from the tail to the head.

The inserts 26a to 26g illustrated in FIG. 5 include a taper. These tapers become thinner only from the tail to the head. The insert 26a includes a taper in the head thereof and includes a cylindroid surface extending from the base of the taper in the tail thereof. The insert 26b is formed as a taper from an end of the head to an end of the tail. The insert 26c includes a taper which is rounded on the head side thereof.

The insert 26d illustrated in FIG. 5 includes a taper on the head thereof and also includes a taper in the tail thereof. The taper of the tail becomes thinner in a direction opposite to the press-fitting direction.

The insert 26e illustrated in FIG. 5 includes a cylindroid surface in the head thereof and includes a taper in the tail thereof. The insert 26f includes a taper in the head thereof and includes a cylindroid surface in the tail thereof. The diameter of the cylindroid surface is larger than the diameter of the base of the taper. The insert 26f additionally includes a table surface connecting the taper and the cylindroid surface. The insert 26g includes a cylindroid surface in the head thereof and includes a taper in the tail thereof. The taper of the tail is rounded on the head side.

Figure 6:
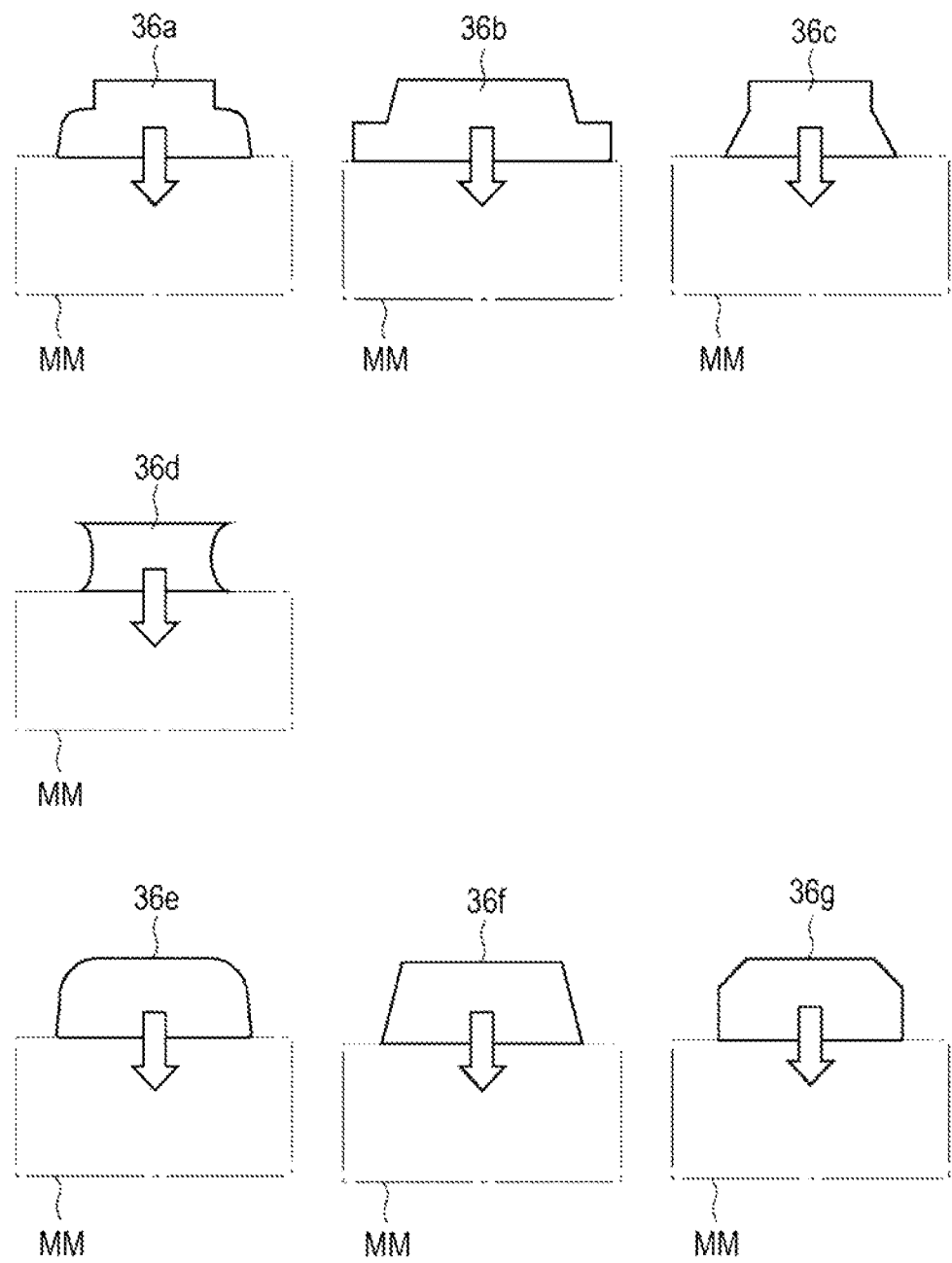
FIG. 6 is a sectional view of various inserts.

FIG. 6 illustrates sections of other inserts. Inserts 36a to 36c and 36e to 36g include a taper. These tapers are so-called inverse tapers which becomes thicker only from the tail side to the head side. When these inserts are press-fitted into the fitting hole of the metal molded product MM, a clamping pressure is not generated on the surface of the inverse tapers. Accordingly, it is preferable that an insert including the taper illustrated in FIGS. 1 to 5 be used for a junction between the insert and the metal molded product MM.

The insert 36d illustrated in FIG. 6 is of a necked type which includes an inverse taper in the head thereof and also includes an inverse taper in the tail thereof. The inverse taper of the tail becomes thinner in the press-fitting direction. Accordingly, at a glance, a clamping pressure is predicted to be applied to the taper of the tail by press-fitting the insert into the fitting hole. However, in this example, since a pocket is formed between the inverse taper of the head and the surface of the fitting hole, there is a likelihood that fretting damage will be promoted. Accordingly, as illustrated in FIGS. 1 to 5, it is preferable that no undercut be formed in front of the tip of the taper.

Modified Example: Variations in Position of Press-Fitted Insert

Figure 7:
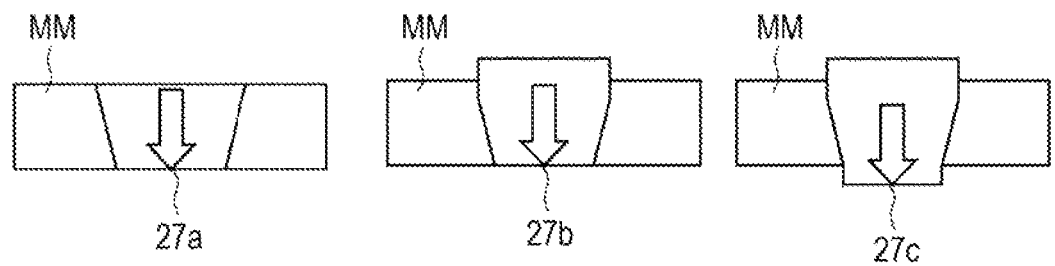
FIG. 7 is a sectional view of various tapers.
Figure 7:
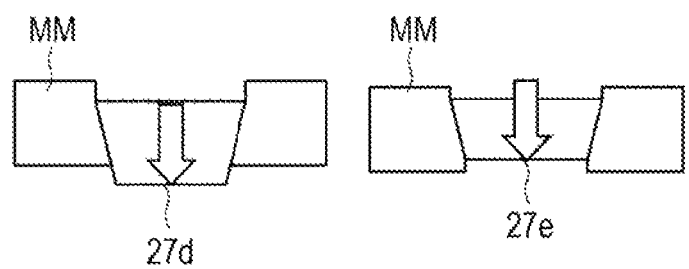

FIG. 7 illustrates sectional views of variations in position of press-fitted inserts. The metal molded product MM includes a fitting hole penetrating the metal molded product. The fitting hole includes an inverse taper. The surface on the thick side of the inverse taper of the fitting hole is defined as a first surface. The surface on the thin side of the inverse taper is defined as a second surface.

As illustrated in FIG. 7, an end face of the tail of the insert 27a and the first surface of the metal molded product MM are flush with each other. An end face of the head of the insert 27a and the second surface of the metal molded product MM are flush with each other. The tail of the insert 27b protrudes from the first surface of the metal molded product MM. An end face of the head of the insert 27b and the second surface of the metal molded product MM are flush with each other. The tail of the insert 27c protrudes from the first surface of the metal molded product MM and the head of the insert 27c protrudes from the second surface. An end face of the tail of the insert 27d is lower than the first surface of the metal molded product MM and the head of the insert 27d protrudes from the second surface. An end face of the tail of the insert 27e is lower than the first surface of the metal molded product MM and an end face of the head of the insert 27e is lower than the second surface of the metal molded product MM.

According to this embodiment, the position of the insert relative to the metal molded product can be set to a desired position. The desired position is obtained by adjusting the height of the insert, the height of the protrusion of the retreat pin, and the press-fitting depth. Through this adjustment, it is possible to decrease a step difference between the end face of the insert and the surface of the metal molded product.

Variations in Shape of Protrusion of Retreat Pin

Figure 8:
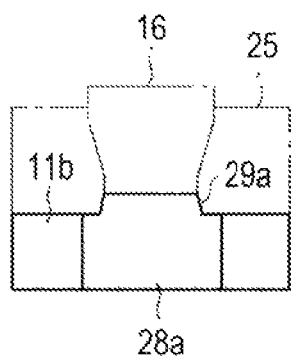
FIG. 8 is a sectional view of various protrusions.
Figure 8:
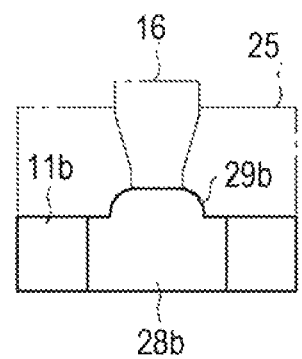
Figure 8:
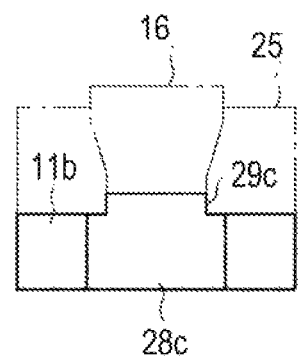
Figure 8:
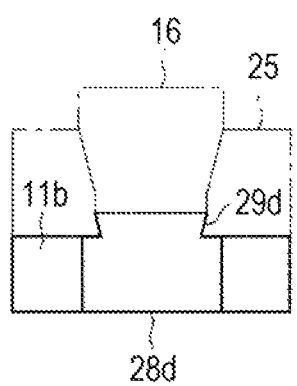

FIG. 8 illustrates shapes of sections of variations of a protrusion on the top of a retreat pin. Similarly to the retreat pin 15b illustrated in FIG. 2, the opening of the lower mold 11b is covered with the retreat pins 28a to 28d illustrated in FIG. 8.

The retreat pin 28a illustrated in FIG. 8 includes a protrusion 29a having a tapered shape. The retreat pin 28b includes a protrusion 29b having a rounded tapered shape. The retreat pin 28c includes a protrusion 29c having a cylindroid shape. The retreat pins including these protrusions are easily detached from the cast product 25 in the semi-cooled state. The retreat pin 28d includes a protrusion 29d having an inverse tapered shape. In the protrusion 29d, since an undercut is formed in the cast product 25, the retreat pin 28d is not easily detached from the cast product 25 in the semi-cooled state.

What is claimed is:

1. A method of manufacturing a cast product with an insert joined thereto, the method comprising:
   covering an insert, which is formed of a first material which is a metal or nonmetal and which includes a taper, with a molten metal which is formed of a second material which is a metal;
   generating a cast product which is formed of the second material by semi-cooling the molten metal to a press-fitting temperature which is higher than a recrystallization temperature of the second material and lower than a melting point of the second material, a fitting hole which is filled with the insert being formed in the cast product, the taper being fitted into the fitting hole, and an undercut not being formed in front of a tip of the taper;

press-fitting the insert into the fitting hole of the cast product while pressing and extending the fitting hole with the taper in a thinning direction of the taper at the press-fitting temperature, the thinning direction being a press-fitting direction; and further cooling the cast product while maintaining the press-fitting.

2. The method of manufacturing a cast product with an insert joined thereto according to claim 1, wherein the method is performed using a mold which includes a first surface and a second surface facing each other with a cavity in the mold interposed therebetween, the first surface including a first opening and the second surface including a second opening, and wherein the method further comprises:
disposing the insert in the cavity;
interposing the insert between an advance pin disposed on the first surface side and a retreat pin disposed on the second surface side;
blocking the first opening with the insert or the advance pin and blocking the second opening with the insert or the retreat pin;
covering the insert with the molten metal by injecting the molten metal into the cavity; and
performing the press-fitting by causing the advance pin, the insert, and the retreat pin to move in the press-fitting direction in a line.

3. The method of manufacturing a cast product with an insert joined thereto according to claim 2, further comprising:

blocking the second opening with the retreat pin, a top of the retreat pin being larger than the tip of the taper;
forming a space in the second opening by press-fitting the retreat pin with a head of the insert and pressing a surplus volume of the cast product out of the space over the second surface by press-fitting the insert; and
further cooling the cast product while maintaining the pressed-out state.

4. The method of manufacturing a cast product with an insert joined thereto according to claim 3, wherein the top of the retreat pin additionally includes a protrusion at the center thereof, and wherein the method further comprises:
blocking the second opening with an outer circumference of the retreat pin;
additionally covering the protrusion with the molten metal by injecting the molten metal into the cavity; and
replacing at least a part of a space occupied by the protrusion with the head of the insert by press-fitting the insert.

5. The method of manufacturing a cast product with an insert joined thereto according to claim 4, wherein the insert additionally includes a cylindroid surface which extends to the head and which is parallel to the press-fitting direction in front of the tip, and wherein the cylindroid surface is fitted into the fitting hole.

6. The method of manufacturing a cast product with an insert joined thereto according to claim 2, further comprising:

blocking the second opening with the retreat pin;
extruding the molten metal, which has permeated a space between a head of the insert and a top of the retreat pin and has solidified, to the periphery thereof by pressing the insert with the advance pin; and
further cooling the cast product while maintaining the extruded state.

7. The method of manufacturing a cast product with an insert joined thereto according to claim 1, wherein the fitting hole penetrates the cast product at least after the insert has been press-fitted.

8. The method of manufacturing a cast product with an insert joined thereto according to claim 1, wherein a melting point of the first material is higher than the melting point of the second material, and wherein a Young's modulus of the first material at the press-fitting temperature is higher than a Young's modulus of the second material.

9. The method of manufacturing a cast product with an insert joined thereto according to claim 1, wherein the first material is a simple substance or an alloy of iron, wherein the second material is a simple substance or an alloy of aluminum, and wherein the press-fitting temperature is higher than 150° C.

10. A method of manufacturing a forged product with an insert joined thereto, the method comprising:

shaping a matte by pressing the matte with a mold at a forging temperature which is higher than a recrystallization temperature of the matte and lower than a melting point of the matte;
forming a fitting hole which is filled with an insert with a taper by press-fitting the insert into the matte at the forging temperature, the taper being fitted into the fitting hole;
generating a forged product formed of the matte by semi-cooling the matte to a re-press-fitting temperature which is higher than the recrystallization temperature of the matte and lower than the forging temperature;
re-press-fitting the insert into the fitting hole of the forged product n in a thinning direction of the taper while clamping the periphery of the fitting hole of the forged product with the mold and pressing and extending the fitting hole with the taper at the re-press-fitting temperature; and
further cooling the forged product while maintaining the re-press-fitting.

* * * * *